(12) United States Patent
Masui et al.

(10) Patent No.: US 10,384,681 B2
(45) Date of Patent: Aug. 20, 2019

(54) VEHICLE CRUISE CONTROL DEVICE AND CRUISE CONTROL METHOD

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Youhei Masui, Kariya (JP); Toyoharu Katsukura, Kariya (JP); Yoshihisa Ogata, Kariya (JP); Takeshi Nanami, Toyota (JP); Takashi Nishida, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/544,856

(22) PCT Filed: Jan. 15, 2016

(86) PCT No.: PCT/JP2016/051121
§ 371 (c)(1),
(2) Date: Jul. 19, 2017

(87) PCT Pub. No.: WO2016/117467
PCT Pub. Date: Jul. 28, 2016

(65) Prior Publication Data
US 2018/0001894 A1  Jan. 4, 2018

(30) Foreign Application Priority Data
Jan. 21, 2015 (JP) .................. 2015-009773

(51) Int. Cl.
*B60W 30/16* (2012.01)
*B60W 40/04* (2006.01)
(Continued)

(52) U.S. Cl.
CPC ............ *B60W 30/16* (2013.01); *B60W 10/06* (2013.01); *B60W 10/18* (2013.01); *B60W 40/04* (2013.01);
(Continued)

(58) Field of Classification Search
CPC .. B60W 10/06; B60W 10/18; B60W 2420/42; B60W 2550/304
See application file for complete search history.

(56) References Cited

U.S. PATENT DOCUMENTS 6,459,980 B1 * 10/2002 Tabata ..................... B60K 6/46
                                                          701/70
6,653,935 B1 * 11/2003 Winner .............. B60K 31/0008
                                                          340/435
(Continued)

FOREIGN PATENT DOCUMENTS

JP      2000-137900 A    5/2000
JP      2004-082912 A    3/2004
(Continued)

*Primary Examiner* — Redhwan K Mawari
(74) *Attorney, Agent, or Firm* — Knobbe, Martens, Olson & Bear, LLP

(57) ABSTRACT

A cruise control device 10 is applied to a vehicle in which an imaging device 21 is mounted. The cruise control device 10 includes: a white line recognition unit 11 which recognizes a white line 61 as a lane boundary that defines an own lane 63 that is a travel lane of an own vehicle 50, on the basis of images acquired by the imaging device 21; and a cutting-in/deviation determination unit 12 which performs cutting-in determination and deviation determination, in which the forward vehicle traveling on an adjacent lane 64 is determined to be a cutting-in vehicle that cuts into the own lane, and the forward vehicle traveling on the own lane is determined to be a deviating vehicle that deviates from the own (Continued)

lane on the basis of a relative position with respect to the white line in a vehicle width direction of a forward vehicle 51.

8 Claims, 3 Drawing Sheets

(51) Int. Cl.
*G08G 1/16* (2006.01)
*B60W 10/06* (2006.01)
*B60W 10/18* (2012.01)
*B60W 30/18* (2012.01)

(52) U.S. Cl.
CPC ....... *G08G 1/167* (2013.01); *B60W 30/18163* (2013.01); *B60W 2420/42* (2013.01); *B60W 2550/304* (2013.01); *B60W 2550/308* (2013.01); *B60W 2720/10* (2013.01); *B60W 2750/308* (2013.01)

(56) References Cited

U.S. PATENT DOCUMENTS

| | | | | |
|---|---|---|---|---|
| 2003/0158648 | A1* | 8/2003 | Kubota | B60K 31/0008 |
| | | | | 701/96 |
| 2004/0236491 | A1* | 11/2004 | Seto | B60T 7/22 |
| | | | | 701/96 |
| 2004/0255904 | A1* | 12/2004 | Izawa | B60K 6/445 |
| | | | | 123/352 |
| 2008/0278349 | A1* | 11/2008 | Kataoka | B60W 50/14 |
| | | | | 340/933 |
| 2014/0156158 | A1* | 6/2014 | Matsuno | G08G 1/167 |
| | | | | 701/70 |
| 2015/0100228 | A1 | 4/2015 | Sudou et al. | |
| 2015/0142285 | A1* | 5/2015 | Nagata | B60W 30/143 |
| | | | | 701/70 |
| 2018/0001894 | A1* | 1/2018 | Masui | B60W 30/16 |
| 2018/0009438 | A1* | 1/2018 | Masui | G08G 1/16 |

FOREIGN PATENT DOCUMENTS

| | | |
|---|---|---|
| JP | 2007-176483 A | 7/2007 |
| JP | 2007-331608 A | 12/2007 |

\* cited by examiner

VEHICLE CRUISE CONTROL DEVICE AND CRUISE CONTROL METHOD

CROSS-REFERENCE TO RELATED APPLICATION

This application is based on and claims the benefit of priority from earlier Japanese Patent Application No. 2015-009773 filed on Jan. 21, 2015 the descriptions of which is incorporated herein by reference.

TECHNICAL FIELD

This disclosure relates to a traveling control technique for controlling traveling of a vehicle on which an imaging device is mounted.

BACKGROUND ART

As a vehicle cruise control, a vehicle-following control by which an own vehicle travels by following a selected preceding vehicle is known. The preceding vehicle is selected from vehicles traveling on an own lane which is the same lane as that of the own vehicle. In such vehicle-following control, it is important to accurately select a vehicle traveling on an own lane from vehicles detected by a distance measurement sensor, a vehicle-mounted camera or the like. Conventionally, a process is performed in such a manner that a predicted route that is a future traveling route of an own vehicle is calculated, and a vehicle that is present on the calculated predicted route is used as a target of a vehicle-following control. For example, PTL 1 discloses the following technique as a method for selecting a preceding vehicle that is a vehicle-following control target. In the technique of PTL 1, a turning circle computed on the basis of a yaw rate and a vehicle speed is used as a predicted route of an own vehicle. Furthermore, the technique of PTL 1 calculates an own lane probability that is a probability that a forward vehicle is present in an own lane in accordance with an offset distance of a lateral position that is a position in a lateral direction between a path of the own vehicle and the forward vehicle. As a result, the technique of PTL 1 selects a preceding vehicle to follow in accordance with the calculated own lane probability.

PTL 2 discloses the following technique. The technique of PTL 2 calculates a lateral moving speed that is a moving speed in a lateral direction of a lane of a forward vehicle in order to start early switching of a preceding vehicle. Furthermore, the technique of PTL 2 calculates a predicted lateral position that is a lateral position of a forward vehicle predicted in accordance with the calculated lateral moving speed, and selects a preceding vehicle to follow on the basis of the calculated predicted lateral position.

CITATION LIST

Patent Literature

[PTL 1] JP 2007-331608 A
[PTL 2] JP 2007-176483 A

SUMMARY OF THE INVENTION

Technical Problem

In such conventional selection method, for example, while an own vehicle travels closer to the right or left of an own lane, or while a forward vehicle traveling on an adjacent lane adjacent to the own lane travels closer to the own lane, there is a risk that a vehicle traveling on the adjacent lane is erroneously selected as a preceding vehicle as a target of a vehicle-following process.

It is an object of this disclosure to provide a vehicle cruise control technique that can improve stability of selection/non-selection of a preceding vehicle.

Solution to Problem

The cruise control device of this disclosure employs the following means.

This disclosure relates to a vehicle cruise control device applied to a vehicle in which an imaging device for imaging a region in front of an own vehicle is mounted. The cruise control device of this disclosure includes a boundary recognition means recognizing a lane boundary that defines an own lane that is a travel lane of the own vehicle, on the basis of an image acquired by the imaging device, and a vehicle determination means performing cutting-in determination and deviation determination with regard to a forward vehicle traveling ahead of the own vehicle, in which the forward vehicle traveling on an adjacent lane adjacent to the own lane is determined to be a cutting-in vehicle that cuts into the own lane, and the forward vehicle traveling on the own lane is determined to be a deviating vehicle that deviates from the own lane, on the basis of a relative position with respect to a recognized boundary that is the lane boundary recognized by the boundary recognition means in a vehicle width direction of the forward vehicle.

When the forward vehicle changes lane, the forward vehicle moves in the vehicle width direction by crossing over the lane boundary. Therefore, the relative position of the forward vehicle with respect to the lane boundary changes. Meanwhile, the lane boundary of the own lane is a stationary object on a road. Therefore, the relative position of the forward vehicle with respect to the lane boundary is defined independently of a position (lateral position) in a lateral direction of the own vehicle in the own lane. In view of these points, the cruise control device of this disclosure is configured so as to perform cutting-in determination and deviation determination of another vehicle on the basis of a relative position with respect to a lane boundary in a vehicle width direction of a forward vehicle. In particular, the cruise control device of this disclosure is configured so as to determine that a forward vehicle traveling on an adjacent lane is a cutting-in vehicle to an own lane and that a forward vehicle traveling on the own lane is a deviating vehicle from the own lane on the basis of a relative position with respect to the lane boundary in the vehicle width direction of the forward vehicle. By this configuration, even when the own vehicle travels closer to the right or left of the own lane, the cruise control device of this disclosure can perform determination of cutting-in and deviation of a forward vehicle with high accuracy. As a result, the cruise control device of this disclosure can improve stability of selection/non-selection of a preceding vehicle that is to be a target of a vehicle-following control when a forward vehicle changes lane.

DESCRIPTION OF THE EMBODIMENT

Hereinafter, an embodiment of a vehicle cruise control device will be described with reference to the drawings. The cruise control device according to this embodiment is mounted in a vehicle, and performs a vehicle-following control by which an own vehicle travels by following a preceding vehicle traveling on an own lane which is the same lane as that of the own vehicle among forward vehicles traveling ahead of the own vehicle. In the vehicle-following control according to this embodiment, a following distance between the own vehicle and the preceding vehicle is controlled. First, a schematic configuration of the cruise control device according to this embodiment will be described with the use of FIG. 1.

Figure 1:
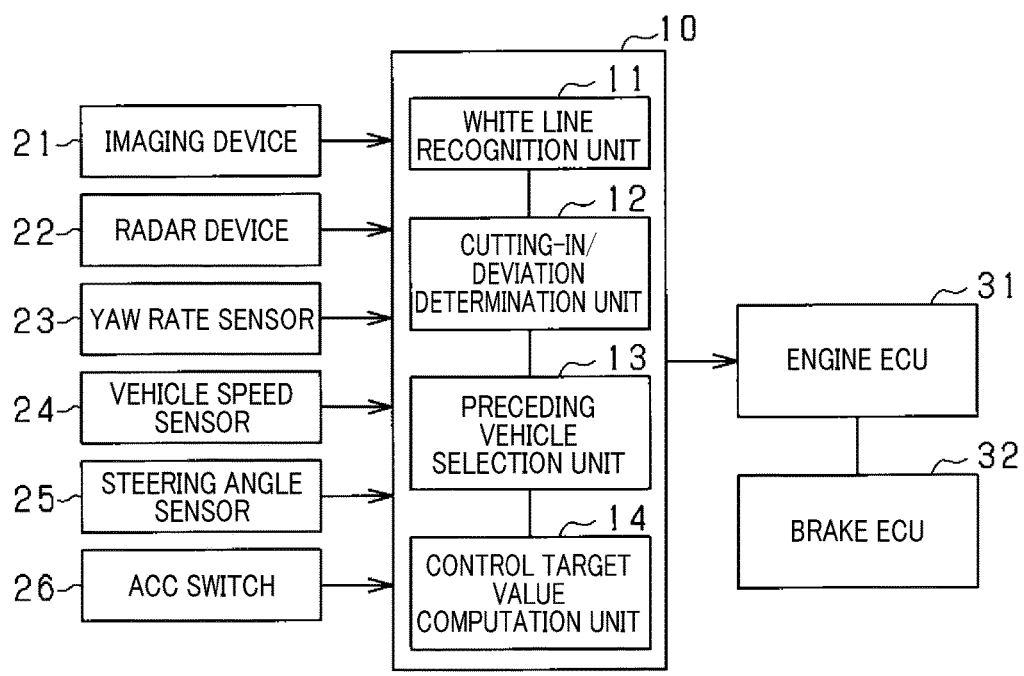
FIG. 1 is a block diagram illustrating a schematic configuration of a vehicle cruise control device.

In FIG. 1, a cruise control device 10 according to this embodiment is a computer provided with a CPU, a ROM, a RAM, an I/O and the like. The cruise control device 10 includes a white line recognition unit 11, a cutting-in/deviation determination unit 12, a preceding vehicle selection unit 13 and a control target value computation unit 14. The cruise control device 10 implements the abovementioned functions by the CPU executing a program installed in the ROM. In the vehicle (own vehicle) in which the cruise control device 10 is mounted, an object detection means detecting an object present in the surroundings of the vehicle is mounted. In addition, in this embodiment, an imaging device 21 and a radar device 22 are mounted as the object detecting means. When information on an object detected is input from the object detecting means, the cruise control device 10 performs the vehicle-following control relative to the preceding vehicle on the basis of the input information.

The imaging device 21 is a vehicle-mounted camera and is composed of a CCD camera, a CMOS sensor, a near-infrared camera and the like. The imaging device 21 images a surrounding environment of the own vehicle (the surroundings of the vehicle) including a traveling road, and generates image data of the captured image. The imaging device 21 sequentially outputs the generated image data to the cruise control device 10. The imaging device 21 is installed, for example, in the vicinity of an upper side of a windshield of the own vehicle, and images a region that extends in front of the vehicle centering around an imaging axis in a range with a predetermined angle δ1 (detectable region of the imaging device 21). In addition, the imaging device 21 may be a monocular camera or a stereo camera.

The radar device 22 is a scanning device that transmits electromagnetic waves as transmission waves and detects an object by receiving reflected waves of the transmission waves. In addition, in this embodiment, the radar device 22 is comprised of a millimeter wave radar. The radar device 22 is attached to the front of the own vehicle, and scans a region (detectable region of the radar device 22) that extends in front of the vehicle centering around a light axis in a range with a predetermined radar angle δ2 (δ2<δ1) using a radar signal. The radar device 22 generates distance measurement data of the detected object on the basis of a time from transmitting the electromagnetic waves toward the front side of the vehicle until receiving the reflected waves. The radar device 22 sequentially outputs the generated distance measurement data to the cruise control device 10. The distance measurement data contains information regarding a direction where the object is present with respect to the own vehicle, a distance from the own vehicle to the object and relative velocity of the object with respect to the own vehicle.

In the imaging device 21 and radar device 22, the imaging axis that is a reference axis of the imaging device 21 and the light axis that is a reference axis of the radar device 22 are attached so as to be in a direction which is the same as a direction parallel to a traveling road surface of traveling road of the own vehicle. A detectable region of the imaging device 21 and a detectable region of the radar device 22 partially overlap with each other.

The cruise control device 10 receives inputs of the image data from the imaging device 21 and the distance measurement data from the radar device 22. In addition, the cruise control device 10 receives inputs of detection signals of other various types of sensors provided in the vehicle. As the other various types of sensors, a yaw rate sensor 23, a vehicle speed sensor 24, a steering angle sensor 25, and an ACC switch 26 and the like are provided. The yaw rate sensor 23 detects an angular velocity (yaw rate) with respect to a turning direction of the vehicle. The vehicle speed sensor 24 detects a vehicle speed of the vehicle. The steering angle sensor 25 detects the steering angle of the vehicle. The ACC switch 26 is an input switch for selecting a permission of performing a vehicle-following control mode.

The cruise control device 10 has the white line recognition unit 11, the cutting-in/deviation determination unit 12, the preceding vehicle selection unit 13 and the control target value computation unit 14. The white line recognition unit 11 functions as a boundary recognition means which recognizes a white line on a road surface as a lane boundary that defines an own lane that is the travel lane of the own vehicle. In this embodiment, the white line is recognized in the following manner. The white line recognition unit 11 receives inputs of the image data from the imaging device 21, and extracts edge points as candidates white lines from the input image data on the basis of the rate of change or the like of luminance in a lateral direction of the input image. The white line recognition unit 11 sequentially stores the extracted edge point for every frame, and recognizes a white line on the basis of a record of the stored edge points. The white line recognition unit 11 stores the recognition result as white line information (information of the recognized lane boundary).

The cutting-in/deviation determination unit 12 functions as a vehicle determination means which detects a cutting-in vehicle that cuts into the own lane that is the travel lane of the own vehicle and a deviating vehicle that deviates from the own lane from among the objects detected by the object detecting means. In short, the cutting-in/deviation determination unit 12 corresponds to a cutting-in determination function and a deviation determination function related to another vehicle. In the following description, as a matter of convenience, an object detected by the object detecting means is also referred to as a "target". The cutting-in/deviation determination unit 12 according to this embodiment performs fusion of the data of a target detected by the imaging device 21 and a target detected by the radar device 22 which belong to an identical object (image data and distance measurement data that contain a target which belongs to an identical object). The cutting-in/deviation determination unit 12 determines the presence or absence of a forward vehicle, targeting a target (fusion target) obtained by the fusion of data. When determining that there is a forward vehicle, the cutting-in/deviation determination unit 12 performs cutting-in determination and deviation determination of another vehicle. As one example of the fusion of data, with regard to image data and distance measurement data, a plurality of detecting points that are present in a predetermined fusion range are fused as data belonging to an identical object. When the target detected by the imaging device 21 and the target detected by the radar device 22 are in a predetermined positional relationship, fusion of data is performed on the supposition that image data and distance measurement data corresponding to the detected target belong to an identical object. Note that the method for fusing data is not limited to this.

The preceding vehicle selection unit 13 selects/deselects a preceding vehicle that is to be a target of a vehicle-following process from among the objects detected by the object detecting means on the basis of the determination result of the cutting-in/deviation of the other vehicle by the cutting-in/deviation determination unit 12. In the cruise control device 10 according to this embodiment, a basic map in which an own lane probability is defined indicating a probability that a forward vehicle is present on the own lane that is the travel lane of the own vehicle is preliminarily stored in accordance with an offset position (hereinafter, referred to as "offset position in the lateral direction") that is a relative position with respect to an own vehicle in a vehicle width direction (lateral direction) of the forward vehicle. In short, the cruise control device 10 stores map data in which an offset position in the lateral direction of the forward vehicle and the own lane probability are preliminarily associated with each other in a predetermined storage area (for example, a memory, etc.). The preceding vehicle selection unit 13 reads the own lane probability corresponding to an offset position in the lateral direction of the forward vehicle from the data of the basic map, and corrects the own lane probability in accordance with the determination result of the cutting-in/deviation determination unit 12. The preceding vehicle selection unit 13 selects a forward vehicle in which the corrected own lane probability is a predetermined value or higher as a preceding vehicle of the vehicle-following control object. Otherwise, with regard to a forward vehicle in which the own lane probability is lower than a predetermined value, the selection as the preceding vehicle of the vehicle-following control object is cleared. With regard to the offset position in the lateral direction of the forward vehicle, for example, the offset position is obtained by correcting a position coordinate in the vehicle width direction (lateral direction) detected by the imaging device 21 on the basis of an estimated R that is a curve radius of a predicted route (curve) in the own vehicle. In addition, in this embodiment, a center position in the lateral direction of a target corresponding to the forward vehicle is used as an offset position in the lateral direction of the forward vehicle.

The cruise control device 10 according to this embodiment controls a vehicle speed (running speed) of the own vehicle in order to keep a following distance between the preceding vehicle selected by the preceding vehicle selection unit 13 and the own vehicle at a target interval set in advance. The control target value computation unit 14 calculates a control target value for performing such vehicle speed control. In particular, the control target value computation unit 14 calculates a target output, a required braking force and the like of an in-vehicle engine, and outputs the calculated control value to the engine electronic control unit (engine ECU 31) as a control signal. The cruise control device 10 according to this embodiment is configured so as to output a control signal to the engine ECU 31, which in turn outputs the control signal to the brake electronic control unit (brake ECU 32). Note that the output configuration of a control signal is not limited to this. For example, the cruise control device 10 may be configured so as to output the control signal to each of the engine ECU 31 and the brake ECU 32.

Next, the cutting-in determination and deviation determination of another vehicle according to this embodiment will be described in detail. The cutting-in/deviation determination unit 12 performs a plurality of determination processes in which determination parameters used for the determination of cutting-in and deviation of a forward vehicle with respect to the own lane that is the travel lane of an own vehicle are respectively different from one another. In particular, the cutting-in/deviation determination unit 12 has a first determination means determining cutting-in and deviation on the basis of a relative position with respect to a white line recognized by the white line recognition unit 11 (recognized boundary) in the vehicle width direction (lateral direction) of the forward vehicle. In addition, the cutting-in/deviation determination unit 12 has a second determination means determining cutting-in and deviation on the basis of a relative position with respect to the own vehicle is in the vehicle width direction (lateral direction) of a forward vehicle. The cutting-in/deviation determination unit 12 performs the cutting-in determination and deviation determination of another vehicle (first determination process) by the first determination means or the cutting-in determination and deviation determination of another vehicle (second determination process) by the second determination means in accordance with fulfillment or not of a predetermined execution condition.

Figure 2:
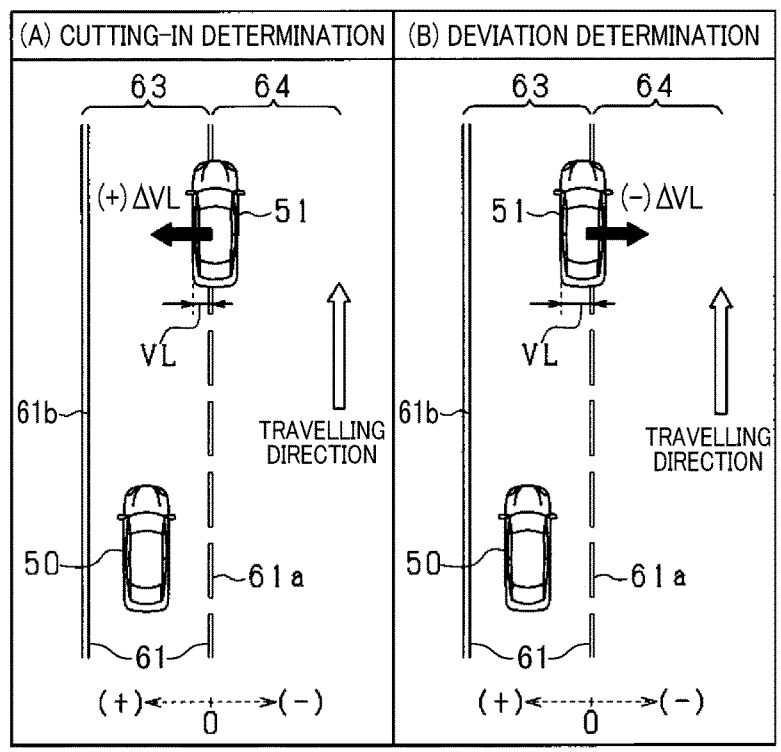
FIG. 2 is a diagram for illustrating cutting-in determination and deviation determination of another vehicle by a first determination means.

First, the cutting-in determination and deviation determination of the other vehicle by the first determination means will be described with the use of FIG. 2. FIG. 2 illustrates a case where a forward vehicle 51 is present within a range of a detected distance in the lateral direction of a white line 61 (a recognition distance in the lateral direction of a recognized boundary by the white line recognition unit 11) detected by an imaging device 21 mounted in the own vehicle 50. FIG. 2 shows an example in which the imaging device 21 detects a white line 61a on the right side and a white line 61b on the left side with respect to a travelling direction of the own vehicle 50.

For example, the forward vehicle 51 traveling on an adjacent lane 64 adjacent to an own lane 63 may change lane to the own lane 63 and cut in in front of the own vehicle 50. In this case, as illustrated in column A of FIG. 2, the forward vehicle 51 approaches the white line 61a on the right side with respect to the travelling direction of the own vehicle 50, and eventually crosses over the white line 61a. That is, the forward vehicle 51 moves from the adjacent lane 64 to the own lane 63. Also, for example, the forward vehicle 51 traveling on the same lane as the own vehicle 50 (own lane 63) may change lane to the adjacent lane 64 and deviate from the own lane 63. In this case, as illustrated in column B of FIG. 2, the forward vehicle 51 approaches the white line 61a on the right side with respect to the travelling direction of the own vehicle 50 and eventually crosses over the white line 61a. That is, the forward vehicle 51 moves from the own lane 63 to the adjacent lane 64. In short, when the forward vehicle 51 changes lane, the forward vehicle 51 crosses over the white line 61*a* and moves in a lateral direction (direction of the arrow) that is a vehicle width direction. In this way, a relative position with respect to the white line 61 in the vehicle width direction (lateral direction) of the forward vehicle 51 changes.

Considering this, the cutting-in determination and deviation determination of the other vehicle by the first determination means uses a relative position with respect to the white line 61 in the vehicle width direction (lateral direction) of the forward vehicle 51 so as to determine the cutting into and deviation from the own lane 63 of the forward vehicle 51. In particular, in this embodiment, the cutting-in determination and deviation determination of another vehicle are performed on the basis of an amount of change and sign of the amount of change (change direction) in the relative position with respect to the white line 61 in the vehicle width direction (lateral direction) of the forward vehicle 51.

In particular, the cutting-in/deviation determination unit 12 performs the following first determination process. The cutting-in/deviation determination unit 12 calculates a white line cross over amount VL indicating a crossing over degree of the forward vehicle 51 with respect to the white line 61 as a parameter indicating the relative position with respect to the white line 61 in the vehicle width direction (lateral direction) of the forward vehicle 51. The cutting-in/deviation determination unit 12 performs the cutting-in determination and deviation determination of another vehicle on the basis of the calculated white line cross over amount VL. The term here "crossing over degree" is an amount of crossing over the white line 61 by a vehicle, and in other words, an amount of entering into the other lane by the vehicle crossing over the white line 61.

Hereinafter, the white line cross over amount VL according to this embodiment will be described in detail. As illustrated in FIG. 2, the white line cross over amount VL is an amount of crossing over the white line 61*a* by the forward vehicle 51. In FIG. 2, the VL is indicated as a distance from a left side to the white line 61*a* in a lateral direction toward the travelling direction of the forward vehicle 51. In addition, according to the abovementioned definition, a value of the white line cross over amount VL becomes zero in a state where the left side of the forward vehicle 51 is positioned on the white line 61*a* and approaches most closely to the white line 61*a*, and becomes a positive value when the forward vehicle 51 crosses over the white line 61*a* by moving in the lateral direction. In this way, as illustrated in column A of FIG. 2, the cutting-in/deviation determination unit 12 determines that the forward vehicle 51 is a cutting-in vehicle to the own lane 63 when an amount of time series change of the white line cross over amount VL is a positive value (an amount of change ΔVL per unit time is a positive value) and the white line cross over amount VL is larger than a first threshold value TH1.

In a case where the forward vehicle 51 moves to the adjacent lane 64 by changing a lane from the same lane as the own vehicle 50 (own lane 63), the VL becomes a negative value when the forward vehicle 51 crosses over the white line 61*a* by moving in the lateral direction. In this way, as illustrated in column B of FIG. 2, the cutting-in/deviation determination unit 12 determines that the forward vehicle 51 is a deviating vehicle from the own lane 63 when the amount of time series change of the white line cross over amount VL is a negative value (an amount of change ΔVL per unit time is a negative value) and the white line cross over amount VL is smaller than a second threshold value TH2.

Figure 3:
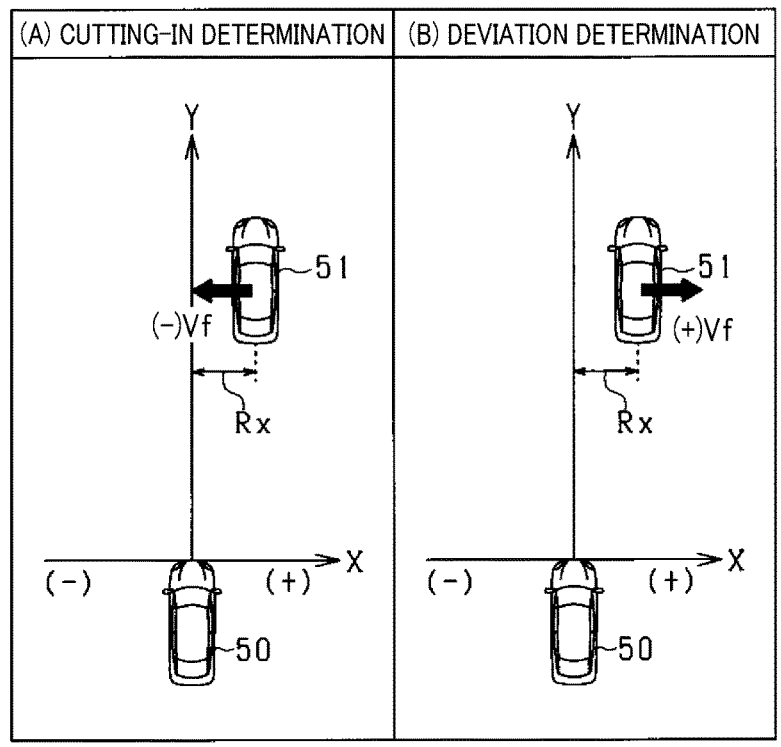
FIG. 3 is a diagram for illustrating the cutting-in determination and deviation determination of another vehicle by a second determination means.

Next, the cutting-in determination and deviation determination of the other vehicle by the second determination means will be described with the use of FIG. 3. FIG. 3 shows a case where the forward vehicle 51 is present outside the range of the detected distance in the lateral direction of the white line 61 detected by the imaging device 21 (a recognition distance of a recognized boundary the by white line recognition unit 11), and the relative position with respect to the white line 61 in the vehicle width direction (lateral direction) of the forward vehicle 51 cannot be used.

The cutting-in determination and deviation determination of the other vehicle by the second determination means is a second determination process for performing cutting-in determination and deviation determination with the use of a relative position in the vehicle width direction (lateral direction) of the forward vehicle 51 that has been calculated relative to the own vehicle 50 as a determination parameter. The cutting-in/deviation determination unit 12 performs the following second determination process. The cutting-in/deviation determination unit 12 calculates an offset position (offset position in the lateral direction) Rx that is a position coordinate based on the own vehicle 50 in the X-axis direction of the forward vehicle 51 on the basis of an orthogonal coordinate system in which a vehicle width direction (lateral direction) of a vehicle is used as an X-axis and a travelling direction of a vehicle is used as a Y-axis. In addition, in the X-axis according to this embodiment, the right side with respect to a travelling direction of the own vehicle 50 is set to be positive and the left side is set to be negative. The cutting-in/deviation determination unit 12 performs the cutting-in determination and deviation determination of another vehicle on the basis of the calculated offset position (offset position in the lateral direction of the forward vehicle 51) Rx and a lateral moving speed (moving speed toward the lateral direction of the forward vehicle 51) Vf represented by a time derivative of the offset position Rx.

In particular, as illustrated in column A of FIG. 3, the cutting-in/deviation determination unit 12 determines that the forward vehicle 51 is a cutting-in vehicle when a sign of the offset position Rx in the lateral direction of the forward vehicle 51 and a sign of the lateral moving speed Vf of the forward vehicle 51 are different from each other, and the lateral moving speed Vf is a threshold value or above and the offset position Rx is smaller than a threshold value. In addition, as illustrated in column B of FIG. 3, the cutting-in/deviation determination unit 12 determines that the forward vehicle 51 is a deviating vehicle when the sign of the offset position Rx in the lateral direction of the forward vehicle 51 and the sign of the lateral moving speed Vf of the forward vehicle 51 are the same, and the lateral moving speed Vf is a threshold value or above and the offset position Rx is threshold value or greater.

The cutting-in/deviation determination unit 12 sets a first condition that the traveling state of the own vehicle 50 is stable with respect to the white line 61, and performs the cutting-in determination and deviation determination of another vehicle on condition that the first condition is fulfilled. In this embodiment, the following three sub-conditions are included as the first condition.

(I) A position in the lateral direction of the own vehicle 50 in the own lane 63 can be obtained from the white line information.

(II) The lateral moving speed Vf of the forward vehicle 51 can be calculated. In short, an unsteady moving width in the lateral direction of the own vehicle 50 is a predetermined value or smaller.

(III) An amount of travel in the lateral direction of the own vehicle 50 is a threshold value or less, and a state where the amount of travel is the threshold value or less continues for a predetermined time.

The cutting-in/deviation determination unit 12 functions as a state determination means determining that the traveling state of the own vehicle 50 is stable with respect to the white line 61 when these three sub-conditions are all fulfilled and thus the first condition is fulfilled.

The cutting-in/deviation determination unit 12 according to this embodiment performs the cutting-in determination and deviation determination of the other vehicle preferentially by the first determination means between the first determination means and the second determination means. In particular, the cutting-in/deviation determination unit 12 functions as a distance determination means determining whether or not the forward vehicle 51 detected by the object detecting means is present within a range of a recognition distance in the lateral direction of the white line 61 recognized by the white line recognition unit 11. When determining that the forward vehicle 51 is present within the range of the recognition distance of the white line 61, the cutting-in/deviation determination unit 12 forbids performing of the cutting-in determination and deviation determination of the other vehicle by the second determination means. In short, when recognizing a white line, selection of a cutting-in vehicle and a deviating vehicle using the offset position Rx in the lateral direction of the forward vehicle 51 as a determination parameter is prevented from being performed. This is because the cutting-in determination and deviation determination of another vehicle using the white line 61 is possible when the forward vehicle 51 is present within the range of the recognition distance of the white line 61. Otherwise, when determining that the forward vehicle 51 is present outside of the range of the recognition distance of the white line 61, the cutting-in/deviation determination unit 12 performs the cutting-in determination and deviation determination of the other vehicle by the second determination means. This is because the cutting-in determination and deviation determination of the other vehicle using the white line 61 is impossible when the forward vehicle 51 is present outside of the range of the recognition distance of the white line 61. As stated above, the cutting-in/deviation determination unit 12 sets a second condition that the forward vehicle 51 is present within the range of the recognition distance of the white line 61, and performs the cutting-in determination and deviation determination of the other vehicle on condition that the second condition is fulfilled.

Next, the cutting-in determination and deviation determination process of another vehicle executed in the cruise control device 10 according to this embodiment will be described with the use of flow charts of FIG. 4 and FIG. 5. First, a main routine of FIG. 4 will be described. This process is performed in a given cycle by the cutting-in/deviation determination unit 12 provided in the cruise control device 10 when the ACC switch 26 is turned on (when a vehicle-following control mode is performed).

Figure 4:
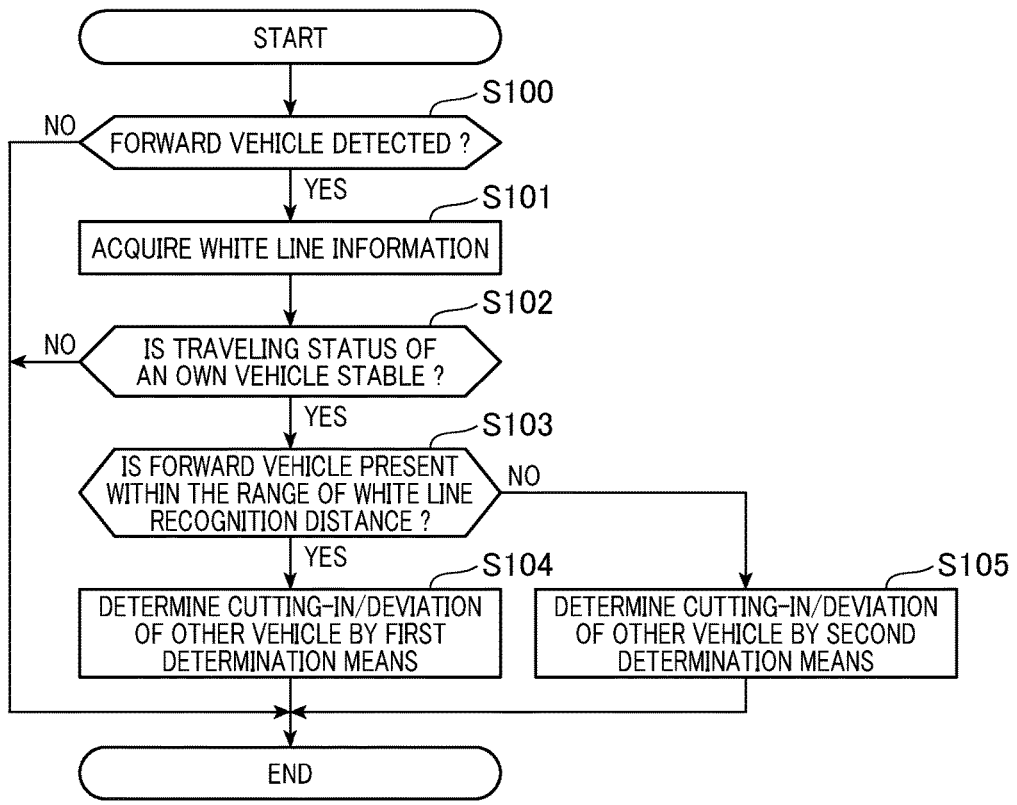
FIG. 4 is a flow diagram illustrating a procedure of the cutting-in determination and deviation determination of another vehicle.
Figure 5:
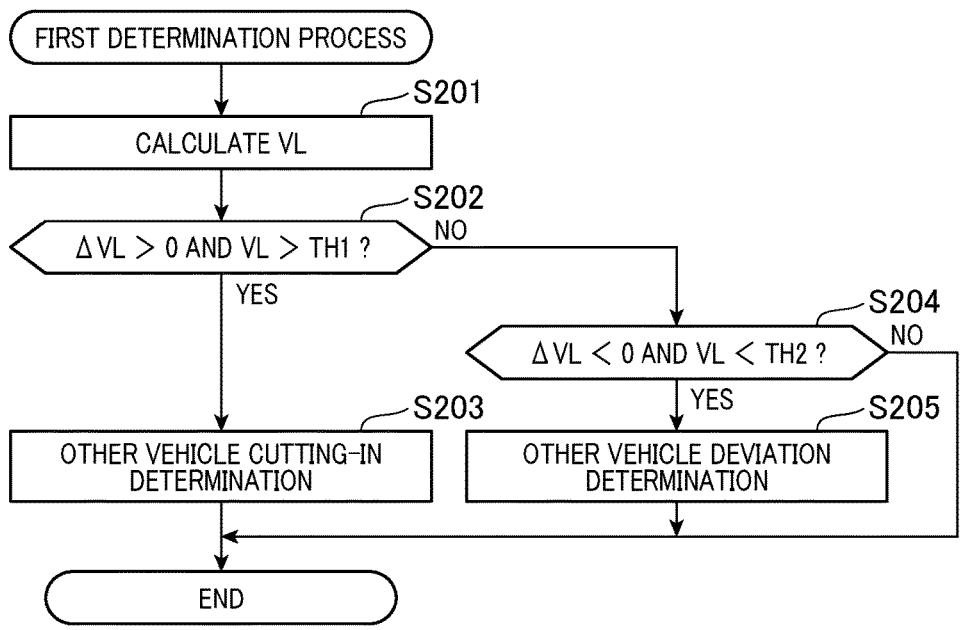
FIG. 5 is a flow diagram illustrating a procedure of a first determination process.

As illustrated in FIG. 4, the cutting-in/deviation determination unit 12 determines whether or not the forward vehicle 51 has been detected by the object detecting means (step S100). In a process of step S100, the presence or absence of the forward vehicle 51 is determined targeting a fusion target. In addition, when there are plurality of the forward vehicles 51, a vehicle to be a determination target of this time is selected from among the plurality of forward vehicles 51. As a result, when determining that a forward vehicle 51 has not been detected (the forward vehicle 51 is not present) (step S100: NO), the cutting-in/deviation determination unit 12 finishes this routine. Otherwise, when determining that the forward vehicle 51 has been detected (the forward vehicle 51 is present) (step S100: YES), the cutting-in/deviation determination unit 12 proceeds to step S101. The cutting-in/deviation determination unit 12 acquires white line information calculated on the basis of the image data of the imaging device 21 from the white line recognition unit 11 (step S101).

Hereafter, the cutting-in/deviation determination unit 12 determines whether or not the traveling state of the own vehicle 50 is stable with respect to the white line 61 on the basis of a result of fulfillment of the first condition (step S102). As a result, when determining that the first condition is not fulfilled and the traveling state of the own vehicle 50 is not stable with respect to the white line 61 (step S102: NO), the cutting-in/deviation determination unit 12 finishes this routine. Otherwise, when determining that the first condition is fulfilled and the traveling state of the own vehicle 50 is stable with respect to the white line 61 (step S102: YES), the cutting-in/deviation determination unit 12 proceeds to step S103, and determines the second condition. That is, the cutting-in/deviation determination unit 12 determines whether or not the forward vehicle 51 detected by the object detecting means is present within the range of the recognition distance of the white line 61 recognized on the basis of white line information (step S103). In addition, in the process of step S101, the cutting-in/deviation determination unit 12 performs the determination of the second condition with the use of the image data of the imaging device 21 acquired along with the white line information from the white line recognition unit 11.

As a result, when determining that the forward vehicle 51 is present within the range of the recognition distance of the white line 61 (step S103: YES), the cutting-in/deviation determination unit 12 proceeds to step S104. That is, when the first condition and the second condition are fulfilled, the cutting-in/deviation determination unit 12 proceeds to step S104. The cutting-in/deviation determination unit 12 performs the cutting-in determination and deviation determination of the other vehicle by the first determination means (step S104). At the same time in this step, the cutting-in/deviation determination unit 12 forbids the cutting-in determination and deviation determination of the other vehicle by the second determination means. Otherwise, when determining that the forward vehicle 51 is not present within the range of the recognition distance of the white line 61 (present outside the range of the recognition distance) (step S103: NO), the cutting-in/deviation determination unit 12 proceeds to step S105. That is, when the first condition is fulfilled and the second condition is not fulfilled, the cutting-in/deviation determination unit 12 proceeds to step S105. The cutting-in/deviation determination unit 12 performs the cutting-in determination and deviation determination of the other vehicle by the second determination means (step S105).

Next, the cutting-in determination and deviation determination of the other vehicle by the first determination means (the first determination process of the abovementioned step S104) will be described with the use of FIG. 5. As illustrated in FIG. 5, the cutting-in/deviation determination unit 12 calculates the white line cross over amount VL indicating the crossing over degree of the forward vehicle 51 with respect to the white line 61 with the use of the image data of the imaging device 21 acquired from the white line recognition unit 11 (step S201). In this embodiment, the white line cross over amount VL is calculated by the following formula (1) with the use of, for example, a vehicle width CW of the forward vehicle 51 and a distance LA between a vehicle center axis of the forward vehicle 51 and the white line 61.

$$VL = CW/2 - LA \quad (1)$$

In addition, the distance LA is a value detectable from the image data of the imaging device 21, and in the process of step S201, a detected distance between the white line 61a to be crossed over by the forward vehicle 51 when changing a lane and the vehicle center axis is used.

Hereafter, the cutting-in/deviation determination unit 12 determines whether or not the white line cross over amount VL is on the rise and the white line cross over amount VL is larger than the first threshold value TH1 (step S202). In addition, the cutting-in/deviation determination unit 12 determines that the white line cross over amount VL is on the rise with the use of an amount of change ΔVL per unit time of the white line cross over amount VL, and makes an affirmative determination when ΔVL is a positive value (when the ΔVL>0). In addition, in this embodiment, a positive value has been set as the first threshold value TH1 in order to detect a state where the forward vehicle 51 is crossing over the white line 61a provided between the own lane 63 and the adjacent lane 64.

As a result, when the white line cross over amount VL is on the rise (ΔVL >0) and the white line cross over amount VL is larger than the first threshold value TH1 (VL >TH1) (step S202: YES), the cutting-in/deviation determination unit 12 proceeds to step S203. The cutting-in/deviation determination unit 12 determines that the forward vehicle 51 is a cutting-in vehicle (step S203). In addition, in step S202, it can be determined that amount of change ΔVL of the white line cross over amount VL is on the rise by determining whether or not an increased amount per unit time of the white line cross over amount VL is a predetermined amount or greater.

Otherwise, when the white line cross over amount VL is not on the rise (ΔVL≤0) or the white line cross over amount VL is the first threshold value TH1 or less (VL≤TH1) (step S202: NO), the cutting-in/deviation determination unit 12 proceeds to step S204. The cutting-in/deviation determination unit 12 determines whether or not the white line cross over amount VL is on the decrease and the white line cross over amount VL is smaller than the second threshold value TH2 (step S204). In addition, the cutting-in/deviation determination unit 12 determines that the white line cross over amount VL is on the decrease with the use of an amount of change ΔVL per unit time of the white line cross over amount VL, and makes an affirmative determination when the ΔVL is a negative value (when the ΔVL<0). In addition, in this embodiment, a positive value has been set as the second threshold value TH2 in order to detect a state where the forward vehicle 51 is crossing over the white line 61a provided between the own lane 63 and the adjacent lane 64. In addition, the first threshold value TH1 and the second threshold value TH2 may be the same or different.

As a result, when the white line cross over amount VL is not on the decrease (ΔVL>0) or the white line cross over amount VL is the second threshold value TH2 or greater (VL>TH2)(step S204: NO), the cutting-in/deviation determination unit 12 finishes this routine. Otherwise, when the white line cross over amount VL is on the decrease (ΔVL<0) and the white line cross over amount VL is smaller than the second threshold value (VL<TH2) (step S204: YES), the cutting-in/deviation determination unit 12 proceeds to step S205. The cutting-in/deviation determination unit 12 determines that the forward vehicle 51 is a deviating vehicle (step S205). In addition, in step S204, it can be determined that the amount of change ΔVL of the white line cross over amount VL is on the decrease by determining whether or not a decreased amount of per unit time of the white line cross over amount VL is a predetermined amount or greater.

As described above in detail, in the cruise control device 10 according to this embodiment, the following beneficial effect can be obtained.

The cruise control device 10 according to this embodiment is configured so as to perform cutting-in determination and deviation determination on the basis of the relative position with respect to the white line 61 in the vehicle width direction (lateral direction) of the forward vehicle 51 that is the lane boundary of the own lane 63. In particular, the device 10 is configured so as to determine that the forward vehicle 51 traveling on the adjacent lane 64 is a cutting-in vehicle to the own lane 63, and determine that the forward vehicle 51 traveling on the own lane 63 is a deviating vehicle from the own lane 63. By this configuration, in the cruise control device 10 according to this embodiment, the cutting-in determination and deviation determination of the forward vehicle 51 can be performed with high accuracy even while the own vehicle 50 is travels closer to the right or left of the own lane 63. As a result, in the cruise control device 10 according to this embodiment, when the forward vehicle 51 changes lane, stability of selection/non-selection of a preceding vehicle that is to be a target of a vehicle-following control can be improved.

The cruise control device 10 according to this embodiment is configured so as to perform cutting-in determination and deviation determination on the basis of an amount of change and sign of the amount of change (change direction) in a relative position with respect to the white line 61 in the vehicle width direction (lateral direction) of the forward vehicle 51. The change direction of the abovementioned relative position differs between a case where the forward vehicle 51 cuts into the own lane 63 from the adjacent lane 64 and a case where the forward vehicle 51 deviates from the own lane 63 to the adjacent lane 64. In addition, the amount of change of the abovementioned relative position can be used for the determination of the crossing over degree (the amount of crossing over) of the forward vehicle 51 with respect to the white line 61. In view of this, by configuring in the abovementioned manner, in the cruise control device 10 according to this embodiment, accuracy of determination of whether the forward vehicle 51 is a cutting-in vehicle or a deviating vehicle can be enhanced.

The cruise control device 10 according to this embodiment is configured so as to perform cutting-in determination and deviation determination on the basis of the relative position with respect to the white line 61 in the vehicle width direction (lateral direction) of the forward vehicle 51 on condition that the forward vehicle 51 is determined to be present within the range of the recognition distance of the white line 61. That is, the cruise control device 10 according to this embodiment is configured so as to perform a determination process based on the relative position with respect to the white line 61 in the vehicle width direction (lateral direction) of the forward vehicle 51 only when the cutting-in determination and deviation determination using the white line 61 is possible. By this configuration, in the cruise control device 10 according to this embodiment, incorrect determination in the cutting-in determination and deviation determination of another vehicle can be suppressed.

The cruise control device 10 according to this embodiment is configured so as to perform the cutting-in determination and deviation determination (determination process by the first determination means) based on the relative position with respect to the white line 61 in the vehicle width direction (lateral direction) of the forward vehicle 51, when determining that the forward vehicle 51 is present within the range of the recognition distance of the white line 61. In this case, the cruise control device 10 according to this embodiment is configured so as to forbid performing of cutting-in determination and deviation determination (the determination process by the second determination means) based on a relative position with respect to the own vehicle 50 in the vehicle width direction (lateral direction) of the forward vehicle 51. That is, the cruise control device 10 according to this embodiment is configured so as to perform the determination process by the first determination means in preference to the second determination means when determining that the forward vehicle 51 is present within the range of the recognition distance of the white line 61. In the cutting-in determination and deviation determination of the other vehicle by the second determination means, for example, while the own vehicle 50 travels closer to the right or left of the own lane 63, there is a risk that the forward vehicle 51 traveling on the adjacent lane 64 is determined to be a cutting-in vehicle. Therefore, the determination process by the second determination means has lower determination accuracy than that of the cutting-in determination and deviation determination of the other vehicle by the first determination means. Accordingly, by configuring in the abovementioned manner, the cruise control device 10 according to this embodiment can enhance determination accuracy of the cutting-in determination and deviation determination of another vehicle as highly as possible.

The cruise control device 10 according to this embodiment is configured so as to perform the cutting-in determination and deviation determination of the other vehicle by the second determination means when determining that the forward vehicle 51 is present outside of the range of the recognition distance of the white line 61. In a situation where the cutting-in determination and deviation determination (the determination by the first determination means) based on the relative position with respect to the white line 61 in the vehicle width direction (lateral direction) of the forward vehicle 51 cannot be performed, the cutting-in determination and deviation determination of another vehicle are performed by a determination means other than that (second determination means). By this configuration, the cruise control device 10 according to this embodiment can maximally improve response to switching of selection/non-selection of a preceding vehicle that is to be a target of a vehicle-following control.

The cruise control device 10 according to this embodiment uses the white line cross over amount VL which is the crossing over degree of the forward vehicle 51 with respect to the white line 61 as the parameter indicating the relative position with respect to the white line 61 in the vehicle width direction (lateral direction) of the forward vehicle 51. In addition, the cruise control device 10 according to this embodiment is configured so as to perform the cutting-in determination and deviation determination of another vehicle on the basis of the white line cross over amount VL. By this configuration, the cruise control device 10 according to this embodiment can immediately detect with high accuracy that the lane change by the forward vehicle 51 has started using the crossing over degree of the forward vehicle 51 with respect to the white line 61. As a result, the cruise control device 10 according to this embodiment can improve stability of and response to selection/deselection of a preceding vehicle that is to be a target of a vehicle-following control.

The cruise control device 10 according to this embodiment is configured so as to perform the cutting-in determination and deviation determination on the basis of the relative position with respect to the white line 61 in the vehicle width direction (lateral direction) of the forward vehicle 51 on condition that the traveling state of the own vehicle 50 is determined to be stable with respect to the white line 61. In a case where the traveling state of the own vehicle 50 is not stable with respect to the white line 61, for example, when the own vehicle 50 is intending to change lane or the own vehicle 50 is unsteady, it is highly possible that the cutting-in determination and deviation determination of the forward vehicle 51 are erroneously performed (high possibility of incorrect determination). In view of this, by configuring in the abovementioned manner, the cruise control device 10 according to this embodiment can suppress degradation in accuracy of cutting-in determination and deviation determination of another vehicle.

The cruise control device 10 according to this embodiment uses the white line cross over amount VL which is the crossing over degree of the forward vehicle 51 with respect to the white line 61 as the parameter indicating the relative position with respect to the white line 61 in the vehicle width direction (lateral direction) of the forward vehicle 51. In addition, the cruise control device 10 according to this embodiment is configured so as to perform the cutting-in determination and deviation determination of the other vehicle on the basis of the white line cross over amount VL. Further, a situation is assumed where the forward vehicle 51 traveling on the adjacent lane 64 travels closer to the own lane 63. In such a case, it is supposed that the forward vehicle 51 traveling on the adjacent lane 64 may be erroneously determined to be a preceding vehicle that is to be a target of a vehicle-following control. In view of this, by configuring in the abovementioned manner, the cruise control device 10 according to this embodiment can immediately detect with high accuracy that the lane change by the forward vehicle 51 has started using the crossing over degree of the forward vehicle 51 with respect to the white line 61. As a result, the cruise control device 10 according to this embodiment can improve stability of and response to selection/deselection of a preceding vehicle that is to be a target of a vehicle-following control.

(Other Embodiments)

The cruise control device 10 of this disclosure is not limited to the abovementioned embodiment, and may be implemented as follows for example.

In the abovementioned embodiment, the white line cross over amount VL as the crossing over degree of the forward vehicle 51 with respect to the white line 61 is calculated as the parameter indicating the relative position with respect to the white line 61 in the vehicle width direction (lateral direction) of the forward vehicle 51. Furthermore, in the abovementioned embodiment, the cutting-in determination and deviation determination of the other vehicle has been performed with the use of the calculated white line cross over amount VL. However, the determination parameter is not limited to the white line cross over amount VL. For example, other embodiments may be configured so as to calculate a position coordinate with respect to the white line 61 in the vehicle width direction (lateral direction) of the forward vehicle 51, and perform cutting-in determination and deviation determination of another vehicle by the calculated position coordinate.

In the abovementioned embodiment, the amount of crossing over the white line 61 by the forward vehicle 51 is used as the white line cross over amount VL; however, the way of indicating the crossing over degree of the white line 61a by the forward vehicle 51 is not limited to this. For example, in other embodiments, a distance between the side face of the forward vehicle 51 and the white line 61a may be set as an XL, and the ratio of a distance XL relative to a lane width WL of a travel lane (XL/WL) may be set as the white line cross over amount VL. In addition, the white line cross over amount VL may be a distance from the vehicle center axis of the forward vehicle 51 to the white line 61a. Alternatively, the white line cross over amount VL may not be the amount of crossing over by the forward vehicle 51 over the own lane 63 on which the own vehicle 50 is traveling, and may be an amount of crossing over the adjacent lane 64 by the forward vehicle 51.

In the abovementioned embodiment, the white line cross over amount VL has been calculated with the use of the white line 61a to be crossed over by the forward vehicle 51 as a reference line, but the calculation is not limited to this. For example, in other embodiments, the white line cross over amount VL may be calculated with the use of the white line 61b as a reference line, which is different from the white line 61a to be crossed over by the forward vehicle 51, between right and left white lines 61 that are the lane boundaries of the own lane 63.

In the abovementioned embodiment, in the cutting-in determination and deviation determination of the other vehicle by the first determination means, whether the forward vehicle 51 is a cutting-in vehicle or a deviating vehicle is determined to on the basis of the white line cross over amount VL indicating the amount of crossing over the white line 61 by the forward vehicle 51 (crossing over degree), but the configuration is not limited to this. For example, in other embodiments, whether the forward vehicle 51 is a cutting-in vehicle or a deviating vehicle may be determined on the basis of an amount of approaching to the white line 61 by the forward vehicle 51. In particular, in other embodiments, in a state where the forward vehicle 51 is approaching to the own lane on which the own vehicle 50 is traveling, the cutting-in determination and deviation determination are performed on the basis of a distance ZL from the side face of the forward vehicle 51 to the white line 61a in the lateral direction. In this case, in other embodiments, in a position coordinate in the lateral direction, a direction in which the forward vehicle 51 proceeds toward the own lane 63 is set to be positive, and a direction in which the forward vehicle 51 moves away from the own lane 63 is set to be negative. In this way, when the forward vehicle 51 cuts into the own lane 63, the distance ZL is indicated by a positive value, and when the forward vehicle 51 deviates from the own lane 63, the distance ZL is indicated by a negative value. As stated above, in other embodiments, when an approaching degree is used, the distance ZL in the lateral direction from the side face of the forward vehicle 51 to the white line 61a is compared with a predetermined threshold value, and whether the forward vehicle 51 is a cutting-in vehicle or a deviating vehicle is determined on the basis of the comparison result.

In the abovementioned embodiment, the cutting-in/deviation determination unit 12 has the first determination means and the second determination means. Furthermore, in the abovementioned embodiment, the determination by the first determination means or the determination by the second determination means is performed in accordance with fulfillment or not of a predetermined execution condition, but the configuration is not limited to this. For example, the cutting-in/deviation determination unit 12 according to other embodiments may be configured so as to have only the first determination means and perform the cutting-in determination and deviation determination of another vehicle.

In the abovementioned embodiment, when the forward vehicle 51 is present outside of the range of the recognition distance of the white line 61 (further than the recognition distance), the cutting-in determination and deviation determination of the other vehicle by the second determination means is performed, but the configuration is not limited to this. For example, in other embodiments, the processing per se of the cutting-in determination and deviation determination of another vehicle may not be performed (a configuration for forbidding the performing of the determination). In particular, if a negative determination is made in the process of step S103 in FIG. 4, the processing of step S105 may not be performed and this routine may be finished.

In the abovementioned embodiment, when it is determined that the traveling state of the own vehicle 50 is not stable with respect to the white line 61, the cutting-in determination and deviation determination of another vehicle is not performed (a configuration for forbidding the performing of the determination), but the configuration is not limited to this. For example, other embodiments may be configured so as to perform the cutting-in determination and deviation determination of the other vehicle by the second determination means.

In the abovementioned embodiment, a state in which the traveling state of the own vehicle 50 is stable with respect to the white line 61 is set to be the first condition, and the cutting-in determination and deviation determination of another vehicle are performed on condition that the first condition is fulfilled. In the abovementioned embodiment, when three sub-conditions (I)-(III) that are the first condition are all fulfilled, the traveling state of the own vehicle 50 is determined to be stable with respect to the white line 61, but the configuration is not limited to this. For example, in other embodiments, when at least two sub-conditions are fulfilled among the abovementioned three sub-conditions (I)-(III), it may be determined that the first condition is fulfilled. In other embodiments, if at least one condition is fulfilled among the abovementioned three sub-conditions (I)-(III), it may be determined that the first condition is fulfilled.

In the abovementioned embodiment, the cutting-in determination and deviation determination of another vehicle are performed targeting a fusion target, but the configuration is not limited to this. For example, other embodiments may be configured so as to perform the cutting-in determination and deviation determination of another vehicle, targeting either one of the target detected by the imaging device 21 or the target detected by the radar device 22.

In the abovementioned embodiment, the imaging device 21 and the radar device 22 are provided as the object detecting means, but the configuration is not limited to this. For example, in other embodiments, a sonar for detecting an object with the use of ultrasonic waves for transmission waves may be provided as an alternative to the radar device 22. In addition, in other embodiments, the technique of this disclosure may be applied to a system in which only the imaging device 21 is provided as the object detecting means.

REFERENCE SIGNS LIST

10 . . . Cruise control device, 11 . . . White line recognition unit, 12 . . . Cutting-in/deviation determination unit, 13 . . . Preceding vehicle selection unit, 14 . . . Control target value computation unit, 21 . . . Imaging device, 22 . . . Radar device, 23 . . . Yaw rate sensor, 31 . . . Engine ECU, 32 . . . Brake ECU

The invention claimed is:

1. A vehicle cruise control device in which an imaging device for imaging a region in front of an own vehicle is mounted, the vehicle cruise control device comprising:
a boundary recognition means recognizing a lane boundary that defines an own lane that is a travel lane of the own vehicle on the basis of an image acquired by the imaging device; and
a vehicle determination means performing cutting-in determination and deviation determination with regard to a forward vehicle traveling ahead of the own vehicle, in which the forward vehicle traveling on an adjacent lane adjacent to the own lane is determined to be a cutting-in vehicle that cuts into the own lane, and the forward vehicle traveling on the own lane is determined to be a deviating vehicle that deviates from the own lane, on the basis of a relative position with respect to a recognized boundary that is the lane boundary recognized by the boundary recognition means in a vehicle width direction of the forward vehicle;
a distance determination means determining whether or not the forward vehicle is present within a range of a recognition distance of the recognized boundary recognized by the boundary recognition means, wherein
the vehicle determination means includes a first determination means performing the cutting-in determination and deviation determination on the basis of the relative position with respect to the recognized boundary in the vehicle width direction of the forward vehicle and a second determination means performing the cutting-in determination and deviation determination on the basis of a relative position with respect to the own vehicle in the vehicle width direction of the forward vehicle,
the vehicle determination means performs the cutting-in determination and deviation determination on the basis of the relative position with respect to the recognized boundary in the vehicle width direction of the forward vehicle on condition that it is determined by the distance determination means that the forward vehicle is present within the range of the recognition distance, and
the vehicle determination means forbids performing of the cutting-in determination and deviation determination by the second determination means based on the distance determination means determining that the forward vehicle is present within the range of the recognition distance.

2. The vehicle cruise control device according to claim 1, wherein the vehicle determination means performs the cutting-in determination and deviation determination on the basis of an amount of change and a change direction at a relative position with respect to the recognized boundary in the vehicle width direction of the forward vehicle.

3. The vehicle cruise control device according to claim 1, wherein the vehicle determination means performs the cutting-in determination and deviation determination by the first determination means based on the distance determination means determining that the forward vehicle is present within the range of the recognition distance, and performs the cutting-in determination and deviation determination by the second determination means based on the distance determination means determining that the forward vehicle is present outside the range of the recognition distance.

4. The vehicle cruise control device according to claim 1, wherein the vehicle determination means calculates an approaching or crossing over degree of the forward vehicle with respect to the recognized boundary as a parameter indicating the relative position with respect to the recognized boundary in the vehicle width direction of the forward vehicle, and performs the cutting-in determination and deviation determination on the basis of the calculated degree.

5. A cruise control method by a vehicle cruise control device in which an imaging device for imaging a region in front of an own vehicle is mounted, the method comprising:
a boundary recognition step of recognizing a lane boundary that defines an own lane that is a travel lane of the own vehicle on the basis of an image acquired by the imaging device;
a vehicle determination step of performing cutting-in determination and deviation determination with regard to a forward vehicle traveling ahead of the own vehicle, in which the forward vehicle traveling on an adjacent lane adjacent to the own lane is determined to be a vehicle cutting into the own lane on the basis of a relative position (VL) with respect to a recognized boundary that is the lane boundary recognized by the boundary recognition step in the vehicle width direction of the forward vehicle, and the forward vehicle traveling on the own lane is determined to be a deviating vehicle that deviates from the own lane; and
a distance determination step of determining whether or not the forward vehicle is present within a range of a recognition distance of the recognized boundary, wherein
the vehicle determination step includes a first determination step performing the cutting-in determination and deviation determination on the basis of the relative position with respect to the recognized boundary in the vehicle width direction of the forward vehicle and a second determination step performing the cutting-in determination and deviation determination on the basis of a relative position with respect to the own vehicle in the vehicle width direction of the forward vehicle,
wherein, during the vehicle determination step, the vehicle cruise control device is configured to perform the cutting-in determination and deviation determination on the basis of the relative position with respect to the recognized boundary in the vehicle width direction of the forward vehicle on condition that it is determined by the distance determination step that the forward vehicle is present within the range of the recognition distance, and
in the vehicle determination step, the vehicle cruise control device forbids performing of the cutting-in determination and deviation determination by the second determination step based on the vehicle cruise control device determining that the forward vehicle is present within the range of the recognition distance by the distance determination step.

6. A vehicle cruise control device in which an imaging device for imaging a region in front of an own vehicle is mounted, the vehicle cruise control device comprising:
a memory;
a processor communicable to the memory; and
a set of computer-executable instructions stored on the memory that cause the processor to implement:

recognizing a lane boundary that defines an own lane that is a travel lane of the own vehicle on the basis of an image acquired by the imaging device;

performing cutting-in determination and deviation determination with regard to a forward vehicle traveling ahead of the own vehicle, in which the forward vehicle traveling on an adjacent lane adjacent to the own lane is determined to be a cutting-in vehicle that cuts into the own lane, and the forward vehicle traveling on the own lane is determined to be a deviating vehicle that deviates from the own lane, on the basis of a relative position with respect to a recognized boundary that is the lane boundary recognized by the processor in a vehicle width direction of the forward vehicle; and determining whether or not the forward vehicle is present within a range of a recognition distance of the recognized boundary, wherein the processor performs the cutting-in determination and deviation determination on the basis of the relative position with respect to the recognized boundary in the vehicle width direction of the forward vehicle and performs the cutting-in determination and deviation determination on the basis of a relative position with respect to the own vehicle in the vehicle width direction of the forward vehicle, the processor further performs the cutting-in determination and deviation determination on the basis of the relative position with respect to the recognized boundary in the vehicle width direction of the forward vehicle on condition that it is determined that the forward vehicle is present within the range of the recognition distance, and the processor forbids performing of the cutting-in determination and deviation determination based on determining that the forward vehicle is present within the range of the recognition distance.

7. A vehicle cruise control device in which an imaging device for imaging a region in front of an own vehicle is mounted, the vehicle cruise control device comprising:

a boundary recognition means recognizing a lane boundary that defines an own lane that is a travel lane of the own vehicle on the basis of an image acquired by the imaging device;

a vehicle determination means performing cutting-in determination and deviation determination with regard to a forward vehicle traveling ahead of the own vehicle, in which the forward vehicle traveling on an adjacent lane adjacent to the own lane is determined to be a cutting-in vehicle that cuts into the own lane, and the forward vehicle traveling on the own lane is determined to be a deviating vehicle that deviates from the own lane, on the basis of a relative position with respect to a recognized boundary that is the lane boundary recognized by the boundary recognition means in a vehicle width direction of the forward vehicle; and a state determination means determining whether or not a traveling state of the own vehicle is in a stable traveling state with respect to the recognized boundary, wherein the vehicle determination means performs the cutting-in determination and deviation determination on the basis of the relative position with respect to the recognized boundary in the vehicle width direction of the forward vehicle on condition that the state determination means determines that the traveling state of the own vehicle is in a stable traveling state with respect to the recognized boundary.

8. A cruise control method by a vehicle cruise control device in which an imaging device for imaging a region in front of an own vehicle is mounted, the method comprising:

a boundary recognition step of recognizing a lane boundary that defines an own lane that is a travel lane of the own vehicle on the basis of an image acquired by the imaging device;

a vehicle determination step of performing cutting-in determination and deviation determination with regard to a forward vehicle traveling ahead of the own vehicle, in which the forward vehicle traveling on an adjacent lane adjacent to the own lane is determined to be a vehicle cutting into the own lane on the basis of a relative position with respect to a recognized boundary that is the lane boundary recognized by the boundary recognition step in the vehicle width direction of the forward vehicle, and the forward vehicle traveling on the own lane is determined to be a deviating vehicle that deviates from the own lane; and a state determination step of determining whether or not a traveling state of the own vehicle is in a stable traveling state with respect to the recognized boundary, wherein in the vehicle determination step, the vehicle cruise control device performs the cutting-in determination and deviation determination on the basis of the relative position with respect to the recognized boundary in the vehicle width direction of the forward vehicle on condition that it is determined that the traveling state of the own vehicle is in a stable traveling state with respect to the recognized boundary.

* * * * *